United States Patent
Stahl et al.

(10) Patent No.: US 6,611,821 B2
(45) Date of Patent: *Aug. 26, 2003

(54) METHOD OF CHARGING FOR THE USE OF AN INTERNET SERVICE PLUS A SERVICE CONTROL UNIT AND A SERVICE PROVIDER UNIT

(75) Inventors: Uwe Stahl, Leonberg (DE); Wolfgang Lautenschlager, Weissach-Flacht (DE); Harald Orlamünder, Ditzingen (DE); Gerd Siegmund, Stuttgart (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,822

(22) Filed: Sep. 29, 1998

(65) Prior Publication Data
US 2002/0161726 A1 Oct. 31, 2002

(30) Foreign Application Priority Data
Sep. 29, 1997 (DE) .......................................... 197 42 858

(51) Int. Cl.[7] .............................................. G06F 17/60
(52) U.S. Cl. ............................ 705/400; 705/52; 705/53
(58) Field of Search ................................ 705/1, 30, 32, 705/34, 52, 53, 400

(56) References Cited

U.S. PATENT DOCUMENTS

| | | | | |
|---|---|---|---|---|
| 5,602,907 A | * | 2/1997 | Hata et al. | .................... 379/114 |
| 5,884,280 A | * | 3/1999 | Yoshioka et al. | .............. 705/26 |
| 5,918,215 A | * | 6/1999 | Yoshioka et al. | .............. 705/30 |
| 6,145,005 A | * | 11/2000 | Kirkby | ......................... 709/228 |
| 6,192,348 B1 | * | 2/2001 | Mrva et al. | ..................... 705/52 |
| 6,351,745 B1 | * | 2/2002 | Itakura et al. | ................. 707/10 |
| 2001/0027458 A1 | * | 10/2001 | Suwamoto et al. | |

FOREIGN PATENT DOCUMENTS

| | | |
|---|---|---|
| DE | 4142738 | 7/1992 |
| EP | 0765068 | 3/1997 |

(List continued on next page.)

OTHER PUBLICATIONS

Egan: "Costing and Pricinfg for an Integrated Digital Telecommunication Network"; Telecommunications (Northn American Edition), Nov. 1987, v2, n11, pp. 47–54, (Abstract Only).*

(List continued on next page.)

Primary Examiner—Edward R. Cosimano
(74) Attorney, Agent, or Firm—Ware, Fressola Van Der Sluys & Adolphson LLP

(57) ABSTRACT

The invention concerns a method of charging for the use of an internet service (SERV) by a subscriber of a communications network (KN), plus a service unit (SERV_IN) of this communications network and a service provider unit (SERVU) which furnishes the internet service (SERV). The subscriber accesses the internet service (SERV) by means of a terminal (TE) of the communications network. Establishing a communication connection between the terminal (TE) and the internet (INT) triggers the service unit (SERV_IN) of the communications network (KN). When the internet service (SERV) is accessed via this communication connection, an additional control connection (KOMM) is established between the internet service (SERV) and the service unit (SERV_IN). Fee charging data which identify the fees for the use of the internet service by the subscriber are transmitted to the service unit (SERV_IN) of the communications network (KN) via the control connection (KOMM), and the service unit (SERV_IN) of the communications network (KN) then controls the charging of the fees in the communications network (KN).

10 Claims, 3 Drawing Sheets

FOREIGN PATENT DOCUMENTS

| | | | |
|---|---|---|---|
| JP | 06-22057 | * | 1/1994 |
| JP | 09-265456 | * | 10/1997 |
| WO | 9615616 | | 5/1996 |
| WO | 9637848 | | 11/1996 |
| WO | 9701920 | | 1/1997 |
| WO | 9705749 | | 2/1997 |
| WO | 9723988 | | 7/1997 |

OTHER PUBLICATIONS

"Internet–Anschluss ueber das Kabelfersehnetz ( Technische Betriebe Wil and IT firms are offering Internet access to cable TV customers in Wil, Switzerland)"; Neue Zuercher Zeitung, Mar. 27, 1998, (Abstract Only).*

"Technishe Aspekte der Netzzusammenschaltung" by Stahl, et al In: IK, Berlin 46, 1996, pp. 26–29.

"Gebuhrenabrechnung in zusammengeschalteten TK–Netsen", In: ntz, H. 11/96, pp. 20–23.

* cited by examiner

METHOD OF CHARGING FOR THE USE OF AN INTERNET SERVICE PLUS A SERVICE CONTROL UNIT AND A SERVICE PROVIDER UNIT

TECHNICAL FIELD

The invention concerns a method of charging for the use of an internet service by a subscriber of a communications network. It is also directed to a service control unit that is used to charge for the use of an internet service by a subscriber of a communications network, who accesses the internet service via a communication connection of the communications network between the terminal and the internet. It is still further directed to a service provider unit for furnishing a chargeable internet service for a subscriber of a communications network who accesses the internet service by means of a terminal of the communications network.

BACKGROUND OF THE INVENTION

The internet provides a number of chargeable services, for example information services or interactive services. A subscriber of a public telephone network can access these services with a suitable terminal, by establishing a connection via the telephone network to an internet gateway, which gives him network access to the internet.

A common method of charging for the use of such internet services includes asking the user of such a service to transmit his credit card number to the internet service. The chargeable service is then billed via the credit card institution.

The disadvantage of this method is that confidential data, namely the credit card number, are transmitted via a public communications network, namely the internet. This encompasses great security risks.

SUMMARY OF THE INVENTION

The invention starts with an advanced method as described in EP 0765068 A1.

To obtain access to a chargeable internet service, the subscriber first dials a certain number of the telephone network. Dialing this number establishes a connection to a recorded information service of the telephone network, which informs him of a code number for each voice call. The subscriber must then give this code number to the internet service in order to obtain access to this service. In this case the fees for the internet service are charged by billing the subscriber for dialing the recorded information service.

The object of the invention is to support the fee charging for an internet service used by a subscriber of a communications network, particularly a telephone network.

This object is achieved with a method of charging a subscriber of a communications network for the use of an internet service, which he accesses by means of a terminal of the communications network, wherein a service unit of the communications network is triggered when a communication connection is established between the terminal and the internet, that when the internet service is accessed via this communication connection, a control connection is additionally established between the internet service and the service unit of the communications network, that fee charging data, which identify the fees for the use of the internet service by the subscriber, are transmitted via the control connection to the service unit of the communications network, and that the service unit of the communications network controls the charging of the fees in the communications network.

The object is also achieved by a service control unit that is used to charge for the use of an internet service by a subscriber of a communications network, who accesses the internet service via a communication connection of the communications network between the terminal and the internet (INT), wherein the service control unit is equipped with a communication unit for establishing a control connection between the internet service and the service control unit, and with a service logic which is designed so that it can be triggered when the communication connection is established between the terminal and the internet, that it receives fee charging data, which identify the fees for use of the internet service by a subscriber, via the control connection, and that it controls the charging of the fees in the communications network.

The object is further achieved by a service provider unit to furnish a chargeable internet service for a subscriber of a communications network who accesses the internet service by means of a terminal of the communications network, wherein the service provider unit is equipped with a communication unit for communicating with a service unit of the communications network, and with a fee charging unit which is designed so that, when the internet service is accessed via a communication connection in the communications network between the terminal and the internet, it additionally establishes a control connection to the service unit of the communications network, and controls the transmission of fee charging data, which identify the fees for the use of the internet service by the accessing subscriber, to the service unit of the communications network via the control connection.

The basic idea of the invention is to trigger a service of the communications network when the internet is accessed. This service subsequently communicates with the chargeable internet services which the subscriber accesses, and furnishes fee charging data for the use of these services to the communications network, for example to inform the subscriber there, or to control the fees for the use of these internet services.

An advantage of the invention is that it is able to offer a high security standard. There is no need for exchanging security-relevant data between the subscriber and the internet service.

Another advantage of the invention is that it is very user-friendly. The charge for the use of an internet service can take place automatically without requiring the input of special code numbers. Payment of the fees can take place economically through the network operator of the communications network, thus with the telephone bill.

A cost-effective form of implementing the invention includes providing the service unit of the communications network with an IN (Intelligent Network) architecture, and to establish the connection between the internet service and the service unit of the communications network via the internet.

BRIEF DESCRIPTION OF THE DRAWINGS

In the following the invention will be explained as an example by means of an embodiment with the help of the attached drawings.

BEST MODE FOR CARRYING OUT THE INVENTION

Figure 1:
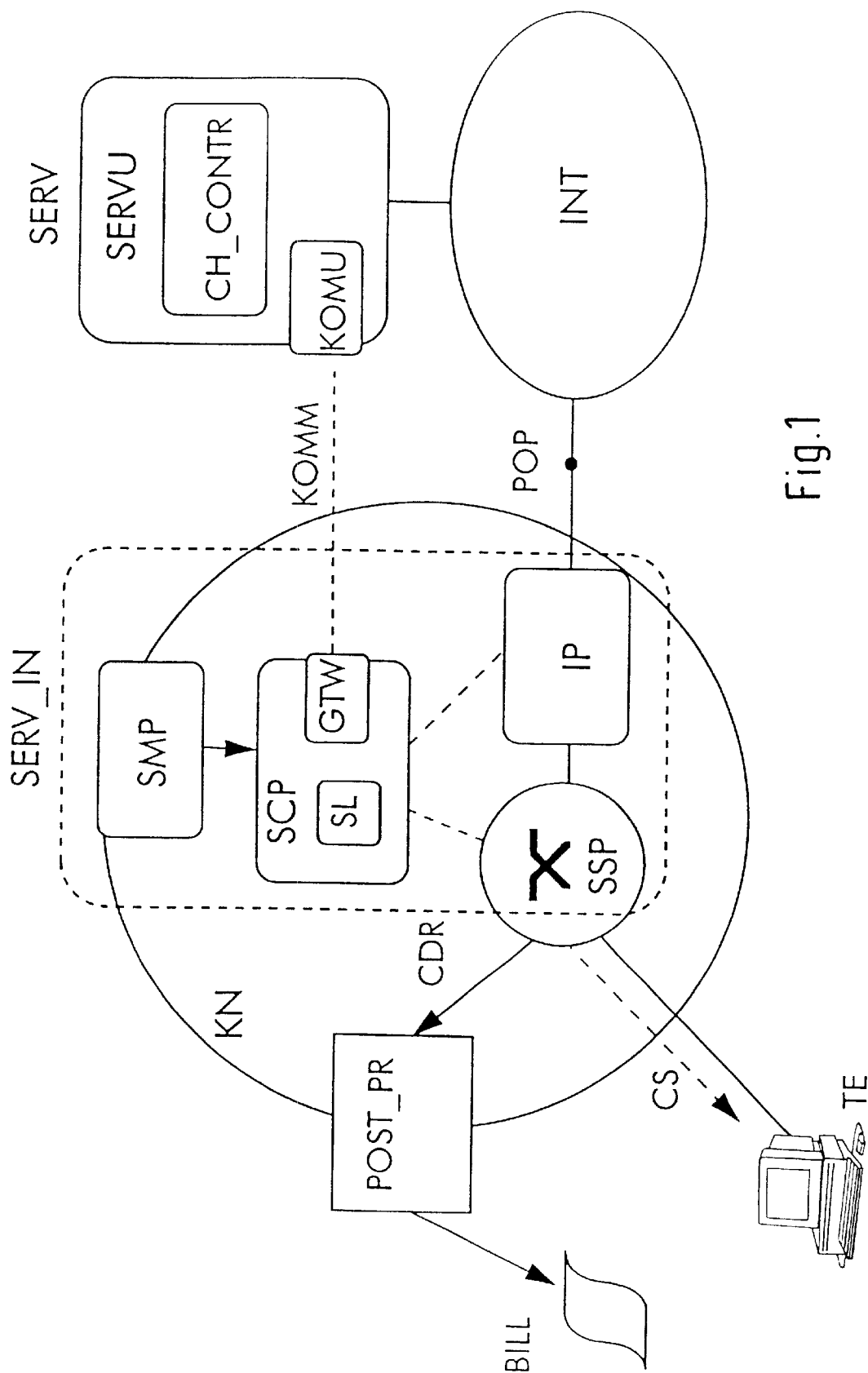
FIG. 1 illustrates a block diagram of a communications environment with a service control unit according to the invention, and a service provider unit according to the invention.

FIG. 1 illustrates two communications networks KN and INT, a terminal TE and a service SERV. The communications network KN is a public ISDN (Integrated Services Digital Network) telephone network. It is also possible that the communications network KN is formed of several public or private telecommunications networks of different network operators. Furthermore, the communications network KN can also be an analog telephone network.

The communications network KN comprises one or several interconnected exchanges, a service unit SERV_IN and a fee charging device POST_PR.

The fee charging device POST_PR represents a fee charging computer of the communications network KN, whereby the charges incurred during a period of time by a subscriber of the communications network KN are determined. The fee charging device POST_PR receives a connection data record CDR from exchanges of the communications network KN and prepares a bill of charges BILL for each subscriber, which is then sent to the subscriber.

The service unit SERV_IN is produced by means of an IN architecture. But it is also possible for the functions of the service unit SERV_IN to be provided by software (SW) programs which are integrated in the control of an exchange of the communications network KN. Another possibility of producing the service unit SERV_IN is that the control function of the service SERV is provided by a server which is connected to the control of an exchange in the communications network KN via a data network.

The service unit SERV_IN comprises a service switching center SSP, a service support device IP, a service control unit SCP and a service management system SMP.

The components of the service unit SERV_IN communicate with each other according to the IN architecture and are constructed in accordance with the usual IN specifications. The service support device IP provides an internet gateway.

The service control unit SCP contains a service logic SL and in addition to the usual configuration of an IN service control unit, a communications unit GTW. The communications unit GTW provides network access to the data network INT and contains the necessary protocol data units for communicating via the data network INT. In this case the communication via the data network INT can also be carried out directly via the communications network KN and a gateway to the data network INT.

The service logic SL comprises the control programs of the service control unit SCP, which control the fee charging for internet services described herein. Of course, it is also possible to install in the service control unit SCP other service logics for other services offered by said service control unit SCP.

The service logic SL is triggered by an IN call addressed to it. It then controls the establishment of the connection between the calling terminal and an internet gateway, and in the following is in a stand-by condition with respect to this communications connection. If it subsequently receives a signal from the communications unit GTW indicating that a subscriber is using, or is about to use, a chargeable internet service via this communications connection, it receives the corresponding fee charging data via the communications unit GTW and controls the charging of these fees in the communications network KN.

The data network INT represents a generally accessible, globally available data network based on the transmission protocol TCP/IP, which is called the internet. The data network INT is connected to the communications network KN via a network gateway POP, and with a service provider unit SERVU which supplies the service SERV.

The service provider unit SERVU contains a computer system with peripheral components which make communication with the data network INT possible. This computer system supports a software platform and application programs which control the provision of the service SERV. The service SERV is an information service which upon request provides chargeable information such as weather reports, stock market quotes, pictures, films or software (SW) programs. It is also possible for the service SERV to provide other or additional services such as reservations, orders, etc.

Beyond that the service provider unit SERVU contains a fee charging unit CH_CONTR and a communications unit KOMU. The communications unit KOMU contains control routines and protocol stacks which make a communication with the service unit SERV_IN possible.

The fee charging unit CH_CONTR contains those control routines of the service provider unit SERVU which control the charging of the fees for the service SERV. If a subscriber of the communications network KN accesses the service SERV, the fee charging unit CH_CONTR controls the establishment of a connection to the service unit SERV_IN. It then transmits fee charging data via this connection, which describe the fees charged for the use of the service by the subscriber. These fees are then charged by the service unit SERV_IN in the communications network KN.

The terminal TE is a computer connected to the communications network KN via an ISDN interface. Through this interface it is able to establish one or several user information channels, and to exchange data via these channels. In this case it is also possible for the computer to be connected to the communications network KN via an analog interface, and the data communication takes place by means of a modem.

Furthermore the computer has the corresponding application programs (internet browser) which make it possible to interact via the data network INT.

The method of the invention and the functional details of the service logic SL and the fee charging unit CH_CONTR are explained in the following by means of the flow diagrams in FIGS. 2 and 3.

Figure 2:
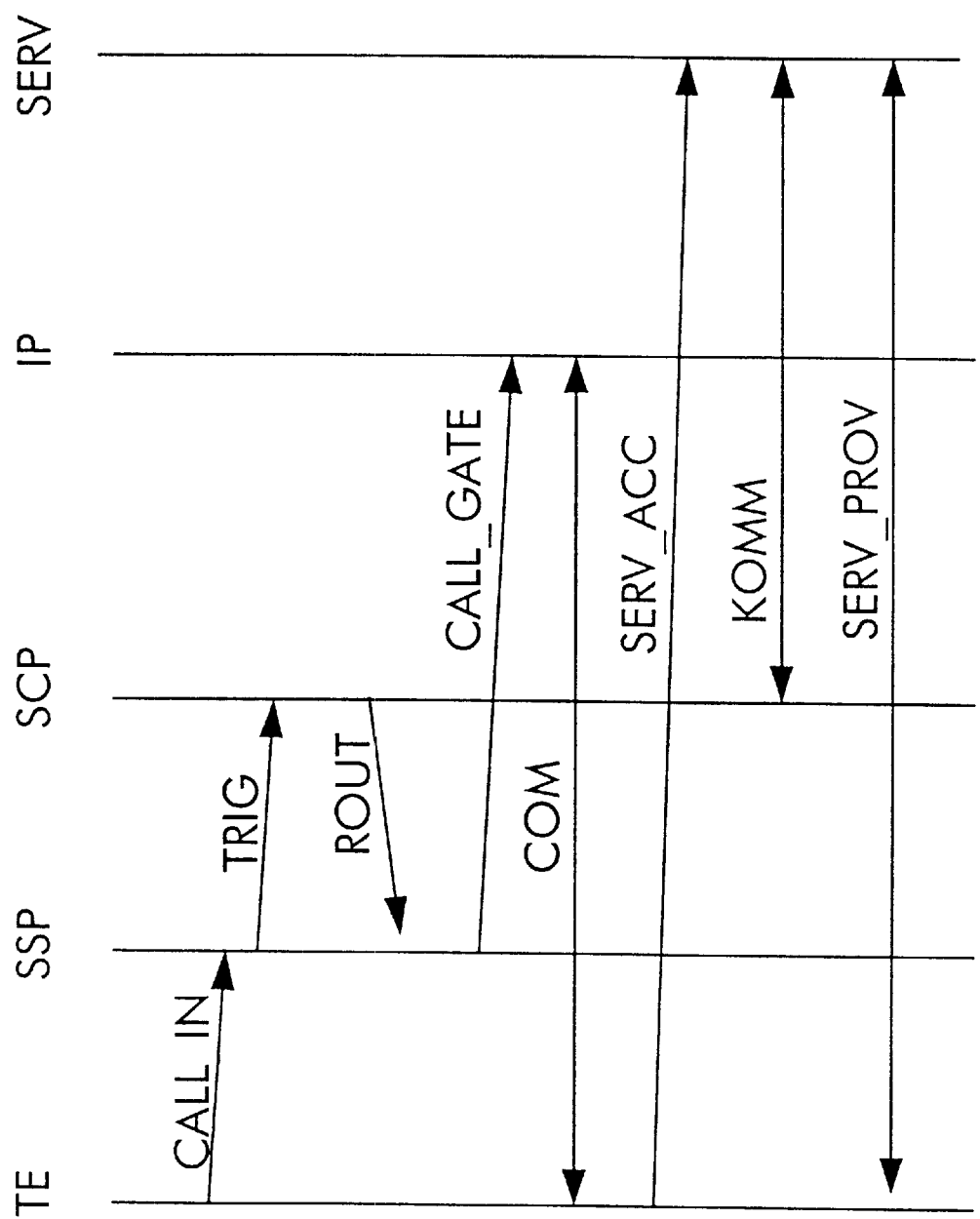
FIG. 2 illustrates a flow diagram for carrying out the method of the invention in the communications environment of FIG. 1.

FIG. 2 illustrates the exchange of messages and the establishment of communication connections between the terminal TE, the service switching center SSP, the service control unit SCP, the service support device IP and the service SERV.

To gain access to the data network INT, the terminal TE sends a connection request CALL_IN to the communications network KN. The number called by the connection request CALL_IN is an IN call number, which is assigned to the service controlled by the service logic SL.

The communications network KN routes the connection request CALL_IN to the service switching center SSP, which recognizes the called number as one assigned to the service logic SL, and sends a corresponding signalling message TRIG to the service control unit SCP via the #7 signalling network, which triggers and thereby activates the service logic SL. The service logic SL finds an available gateway to the data network INT. Such a gateway is provided by the service support device IP for example. But a selection of several of such service support devices IP may also be available, which gives the data network INT a higher transmission capacity. The use of such a gateway has the advantage that the service control unit can inquire about gateway status data directly via #7, and to send control information to the gateway, thus simplifying the selection process for example.

It is of course also possible to select a gateway, or to use one gateway when only one gateway is available which is not part of the service unit SERV_IN and is not part of a service support device.

The service logic SL then causes a message ROUT to be signalled to the service switching center SSP. The message ROUT contains the address of the selected gateway, in this case the service support device IP, and causes the service switching center SSP to forward the waiting connection request with this new address as the destination call number. The thus altered connection request CALL_GATE is routed to the service support device IP, and a user connection COM is then established between the terminal TE and the service support device IP. The terminal TE is now able to communicate with terminals of the data network INT.

The terminal TE now initiates an access SERV_ACC to the service SERV. Before the fee charging unit CH_CONTR releases the access for use of the service SERV, an authentication procedure takes place between the terminal TE and the service SERV, whereby the subscriber identifies himself to the service SERV. To further increase the security, it is also possible to perform an encoding or a further authentication between the service support device IP and the fee charging unit CH_CONTR. But the service support device IP alone can be authenticated with respect to the service SERV. It is furthermore possible to omit the authentication, however this cannot be recommended for security reasons.

A control connection KOMM is established between the communication units GTW and KOMU after the subscriber, or the service support device IP functioning as the access gateway, is known to the fee charging unit CH_CONTR. The establishment of the connection is activated by the fee charging unit CH_CONTR, which has determined by means of the authentication that the accessing subscriber is assigned to the communications network KN, or to the gateway provided by the service support device IP.

But it is also possible for the service logic SL to cause the establishment of the connection. With an authentication by the service support device IP, or by monitoring the subscriber's authentication, the service support device IP is able to determine the address of the service SERV and to report it back to the service logic SL.

It is advantageous to establish the control connection KOMM via the data network INT. But it is also possible to establish this connection via another communications network, or via a special connection line.

The fee charging data are then sent to the service logic SL via the control connection KOMM, and the service logic SL then controls the charging of the fees in the communications network KN. This will be explained in detail in the following by means of FIG. 3. The fee charging unit CH_CONTR then releases the service SERV and the subscriber obtains the service SERV by an interaction SERV_PROV between the service provider unit SERVO and the terminal TE. In this case the release of the service SERV can take place before, during and after the fee charging data have been transmitted.

Figure 3:
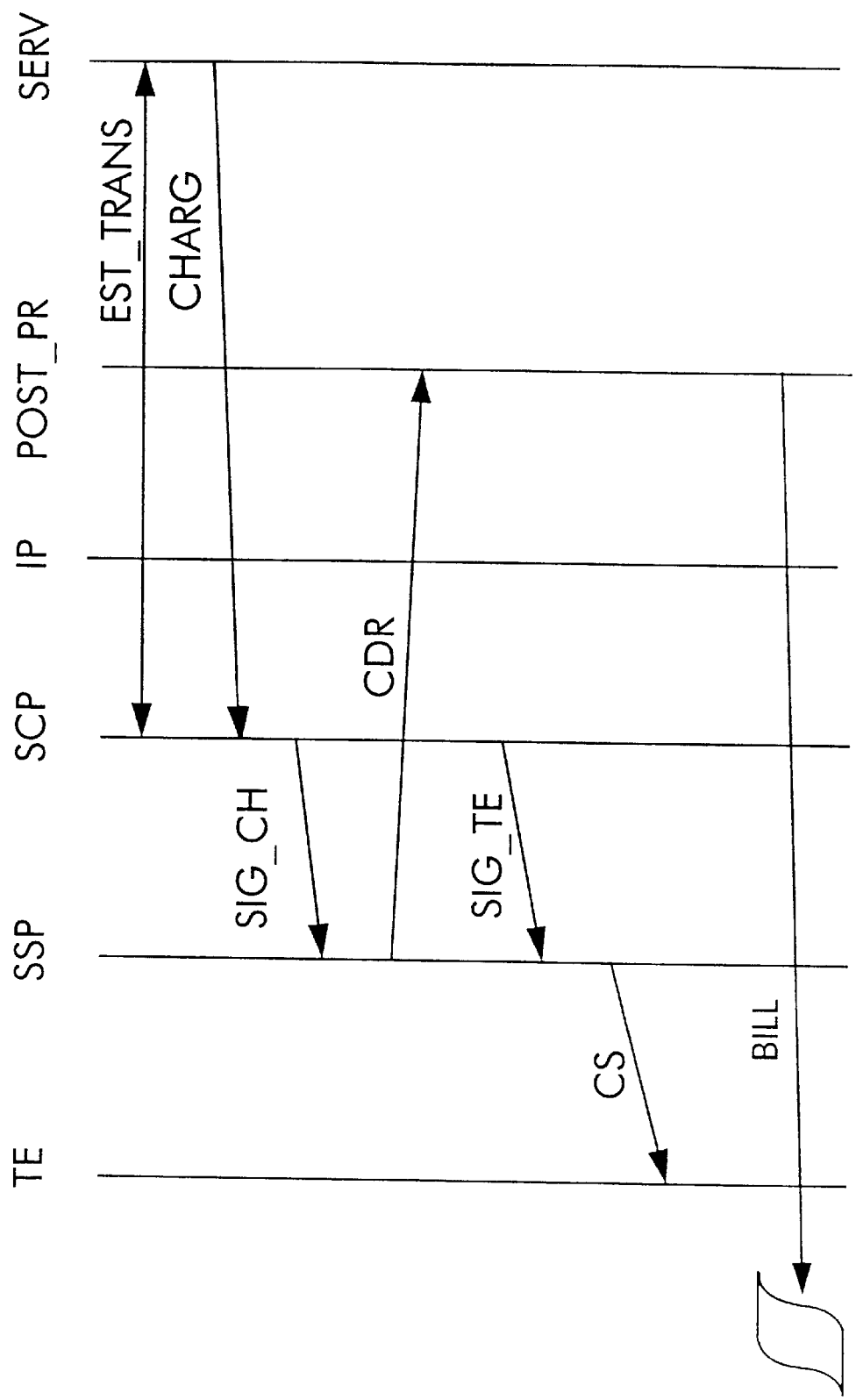
FIG. 3 illustrates a detailed flow diagram for carrying out the method of the invention in the communications environment of FIG. 1.

FIG. 3 illustrates a more detailed exchange of messages between the terminal TE, the service switching center SSP, the service control unit SCP, the service support device IP, the fee charging device POST_PR and the service SERV.

To charge for the service SERV, messages EST_TRANS are exchanged via the connection KOMM, within the framework of an electronic transaction 20 process, between the service logic SL and the fee charging unit CH_CONTR. By means of this transaction process the service logic SL authorizes the use of the service SERV by the subscriber, and the claim for the payment of the fee for use of the service SERV by the subscriber is transmitted by the operator of the service SERV to the operator of the communications network KN.

It is also possible for the payment claim to be transferred to the operator of the service provided by the service logic SL, if this operator is different from the network operator of the communications network KN. In that case the service logic SL would forward this claim to the network operator of the communications network KN by means of another transaction with the fee charging device POST_PR, or collect the fees by itself. Such a transaction process could also be omitted. However, this would be disadvantageous from the security point of view.

Fee charging data CHARG, which describe the fees for the use of the service SERV by the subscriber, are then sent by the fee charging unit CH_CONTR to the service logic SL. Sending the fee charging data CHARG can take place before the service is provided, for example for information of the subscriber, or in the case of fixed fees for access to the service. It can also take place while the service is being provided, for example when the charging of the fee is time-dependent. It can also take place after the service has been provided, when the amount of the applicable fees has been determined.

The service logic signals these fees to the service switching center SSP by sending a signalling message SIG_CH, which causes the service switching center SSP to register these fees in the subscriber's CDR (Call Data Record), in addition to the transmission fees for the communication connection COM. The service switching center SSP, or another exchange of the communications network KN, then sends this CDR call data record to the fee charging device POST_PR.

In this case the transmission of the CDR call data record to the fee charging device POST_PR can take place both on-line and off-line. The fee charging device POST_PR then establishes the invoice BILL for certain time intervals and sends it to the subscriber.

There is the further possibility for the service logic SL to additionally or exclusively inform the subscriber about the applicable fees or the fees he was charged. To that end the service logic SL sends a signalling message SIG_TE with such fee data CS to the service switching center SSP. The latter transmits the data CS via the ISDN signalling channel to the terminal TE, which then displays the fee data on the screen for the subscriber.

What is claimed is:

1. A method of charging a subscriber of a communications network (KN) for the use of an internet service (SERV) obtained over the internet (INT), which the subscriber accesses by means of a terminal (TE) of the communications network (KN), wherein the communications network (KN) further has a service unit (SERV_IN), comprising the steps of:

triggering the service unit (SERV_IN) of the communications network (KN) when a communication connection (COM) is established between the terminal (TE) and the internet (INT);

establishing a separate control connection (KOMM) between the internet service (SERV) and the service unit (SERV_IN) of the communications network when the internet service (SERV) is accessed via said communication connection (COM);

transmitting, via the control connection (KOMM) to the service unit (SERV_IN) of the communications network, fee charging data (CHARG), which identifies the fees for the use of the internet service by the subscriber via the terminal (TE); and controlling the charging of said fees to the subscriber by the service unit (SERV_IN) of the communications network (KN);

wherein all communication via the internet (INT) between the communications network (KN) and the internet service (SERV) consists of data other than security-relevant data of the subscriber.

2. A method as claimed in claim 1, wherein the control connection (KOMM) between the internet service (SERV) and the service unit (SERV_IN) is established via the internet (INT).

3. A method as claimed in claim 1, wherein the fee charging data is transmitted by the internet service (SERV) to the communications network (KN) by means of an electronic transaction process (EST_TRANS), which is communicated over the control connection (KOMM).

4. A method as claimed in claim 1, wherein the service unit (SERV_IN) signals the received fee charging data (CHARG) to the terminal (TE) via the communications network (KN).

5. A method as claimed in claim 1, wherein the service unit (SERV_IN) includes a connection data record (CDR) associated with the subscriber, and that the service unit (SERV_IN) registers said fees for the use of the internet service in the subscriber's connection data record (CDR).

6. The method of claim 1, wherein the fees are included in a telephone bill of the subscriber.

7. A method as claimed in claim 1, wherein the service unit (SERV_IN) includes an IN service control unit (SCP) and an internet gateway (IP) and wherein in order to establish the communication connection (COM) between the terminal (TE) and the internet (INT), the terminal (TE) sends a connection request (CALL_IN) with an IN telephone number to the service unit (SERV_IN), and that this connection request (CALL_IN) triggers service control unit (SCP) of the service unit, which thereupon causes the communication connection to be established between the terminal (TE) and the internet gateway (IP).

8. A method as claimed in claim 7, wherein the internet gateway is a service support device (IP) of the service unit.

9. A service control unit (SCP) that is used to charge for the use of an internet service (SERV) by a subscriber of a communications network (KN), who accesses the internet service (SERV) via a communication connection (COM) of the communications network between a terminal (TE) and an internet (NT), wherein the service control unit (SCP) comprises:

A) a communication unit (GTW) for establishing a separate control connection (KOMM) between the internet service (SERV) and the service control unit (SCP); and B) a service logic (SL) configured to be triggered when the communication connection (COM) is established between the terminal (TE) and the internet (INT), the service logic for receiving fee charging data (CHARG), which identifies the fees for use of the internet service (SERV) by a subscriber, the service logic receiving the charging data via the control connection (KOMM), and the service logic controlling the charging of the fees in the communications network (KN);

wherein all communication via the internet (NT) between the communications network (KN) and the internet service (SERV) consists of data other than security-relevant data of the subscriber.

10. A service provider unit (SERVU) to furnish a chargeable internet service (SERV) for a subscriber of a communications network (KN), the communications network including a service unit (SERV_IN), the subscriber accessing the internet service (SERV) by means of a terminal (TE) of the communications network (KN), the service provider unit (SERVU) comprising:

A) a communication unit KOMM for communicating with the service unit (SERV_IN) of the communications network (KN); and B) a fee charging unit (CH_CONTR) which is designed so that, when the internet service (SERV) is accessed via a communication connection (COM) in the communications network (KIN) between the terminal (TE) and the internet (INT), the fee charging unit (CH_CONTR) additionally establishes a separate control connection (KOMM) to the service unit (SERV_IN) of the communications network (KN), and controls the transmission of fee charging data (CHARG), which identify the fees for the use of the internet service (SERV) by the accessing subscriber, to the service unit (SERV_IN) of the communications network (KN) via the control connection (KOMM);

wherein all communication via the internet (INT) between the communications network (KN) and the internet service (SERV) consists of data other than security-relevant data of the subscriber.

* * * * *